US012622511B2

(12) United States Patent
Barbé et al.

(10) Patent No.: US 12,622,511 B2
(45) **Date of Patent: *May 12, 2026**

(54) FOREARM SUPPORT FOR A WATCHMAKER'S BENCH AND WATCHMAKER'S BENCH

(71) Applicant: Rolex SA, Geneva (CH)

(72) Inventors: Maxime Barbé, Sallanches (FR); Guillaume Gervy, Mures (FR)

(73) Assignee: Rolex SA, Geneva (CH)

(*) Notice: Subject to any disclaimer, the term of this patent is extended or adjusted under 35 U.S.C. 154(b) by 25 days.

This patent is subject to a terminal disclaimer.

(21) Appl. No.: 18/590,927

(22) Filed: Feb. 28, 2024

(65) Prior Publication Data

US 2024/0292946 A1 Sep. 5, 2024

(30) Foreign Application Priority Data

Mar. 1, 2023 (EP) .................................... 23159283

(51) Int. Cl.
*A47B 21/03* (2006.01)
*G04D 1/00* (2006.01)

(52) U.S. Cl.
CPC ....... *A47B 21/0371* (2013.01); *G04D 1/0014* (2013.01)

(58) Field of Classification Search
CPC ........ A47B 21/0371; A47B 2200/0092; G04D 1/0014; B25H 1/14; B25H 1/02; B25H 1/10
See application file for complete search history.

(56) References Cited

U.S. PATENT DOCUMENTS 1,643,101 A * 9/1927 Thompson ............. A47B 81/00 312/351
1,706,634 A * 3/1929 Seils ........................ G05G 1/62 128/877

(Continued)

FOREIGN PATENT DOCUMENTS

CH 709784 A2 12/2015
CN 209826971 U * 12/2019

(Continued)

OTHER PUBLICATIONS

Hallie Engel online posting dated Mar. 28, 2013 titled "Bergeon unveils slick ergonomic watchmaking bench" on Watchpro, (Year: 2013).*

(Continued)

*Primary Examiner* — Terrell L Mckinnon
*Assistant Examiner* — Ding Y Tan
(74) *Attorney, Agent, or Firm* — Conley Rose, P.C.

(57) ABSTRACT

Forearm support for a watchmaker's bench, comprising:
- a coupling portion, arranged to be coupled to a watchmaker's bench,
- a first arm linked to the coupling portion,
- a second arm linked to the first arm,
- a forearm support pad, linked to the second arm, and arranged to support a forearm of an operator, characterized in that the forearm support comprises an articulation system comprising at least:
- a first ball joint, arranged between the coupling portion and the first arm and connecting the coupling portion and the first arm,
- a second ball joint, arranged between the first arm and the second arm and connecting the first arm and the second arm.

14 Claims, 6 Drawing Sheets

(56) References Cited

U.S. PATENT DOCUMENTS

| | | | | | |
|---|---|---|---|---|---|
| 5,158,256 | A * | 10/1992 | Gross | A47B 21/0371 248/287.1 |
| 5,215,282 | A * | 6/1993 | Bonutti | A47C 16/00 248/118 |
| 5,281,001 | A * | 1/1994 | Bergsten | A47C 1/0308 248/118 |
| 5,393,125 | A * | 2/1995 | Watson | A47C 1/0305 297/344.18 |
| 5,653,499 | A * | 8/1997 | Goodall | A47B 83/02 297/173 |
| 5,810,301 | A * | 9/1998 | McGrath | A47B 17/02 248/188.5 |
| 6,454,224 | B1 * | 9/2002 | Nogueira | A47B 21/0371 248/118 |
| 2016/0101716 | A1 * | 4/2016 | Brecht | B64D 11/0646 29/428 |
| 2017/0013958 | A1 * | 1/2017 | Attouche | A47B 21/0371 |
| 2024/0223044 | A1 * | 7/2024 | Ma | B25J 19/0004 |

FOREIGN PATENT DOCUMENTS

| | | | |
|---|---|---|---|
| CN | 114451664 | A * | 5/2022 |
| DE | 3328875 | A1 | 2/1985 |
| DE | 3328917 | A1 * | 2/1985 |
| DE | 29800812 | U1 | 4/1998 |

OTHER PUBLICATIONS

Giercy armrest for desk with adjustable arm rest support for computer desk sold on amazon, https://www.amazon.com/Giecy-Adjustable-Computer-Ergonomic-Extender/dp/B09MSZW7S2?th=1 (Year: 2021).*

Online post titled "Design for a Watchmakers Bench" on the watch site forum https://www.thewatchsite.com/threads/design-for-a-watchmakers-bench.18967/ (Year: 2011).*

Foreign Communication from a Related Counterpart Application, Partial European Search Report dated Sep. 27, 2023, European Application No. 23159283.

Foreign Communication from a Related Counterpart Application, European Search Report dated Nov. 23, 2023, European Application No. 23159283.

Tiger Island Handyman: "Custom Workbench with Kreg Jigs", Instructables, Oct. 26, 2020 (Oct. 26, 2020), pp. 1-8, XP093104845, Retrieved from the Internet: URL:https://www.instructables.com/Custom-Workbench-W-Kreg-Jigs/ [retrieved on Aug. 25, 2025].

Mtairymd: "Entry Level Workbench", Instructables, Oct. 29, 2020 (Oct. 29, 2020), pp. 1-43, XP093104838, Retrieved from the Internet: URL:https://www.instructables.com/Entry-Level-Workbench/ [retrieved on Aug. 25, 2025].

Barbé, Maxime, et al., "Watchmaker's Bench and Forearm Support for a Watchmaker's Bench," filed Feb. 28, 2024, U.S. Appl. No. 18/590,926.

* cited by examiner

[Fig. 1]
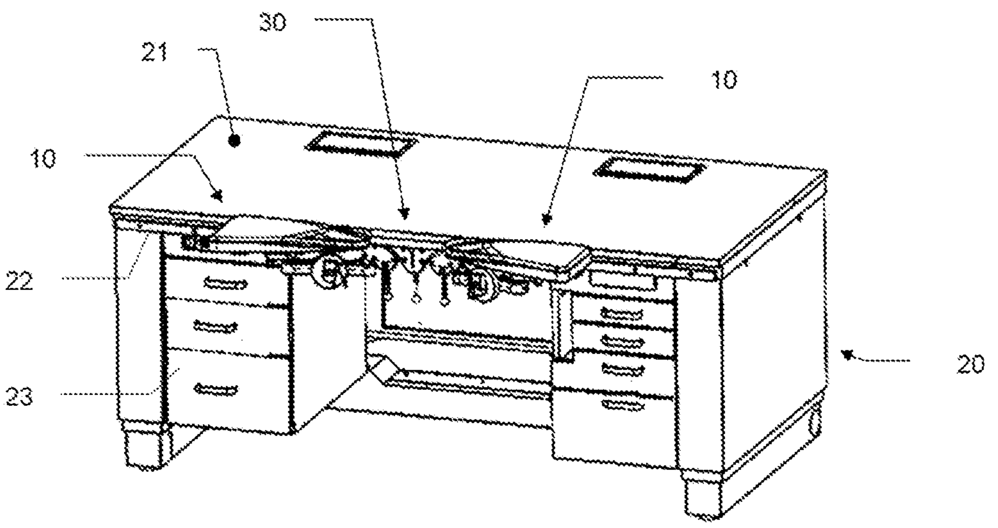
[Fig. 2]
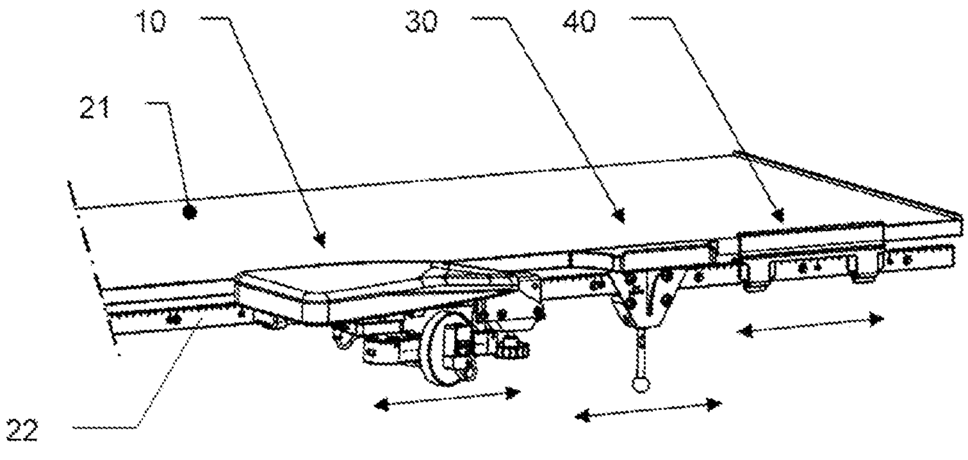

[Fig. 3]
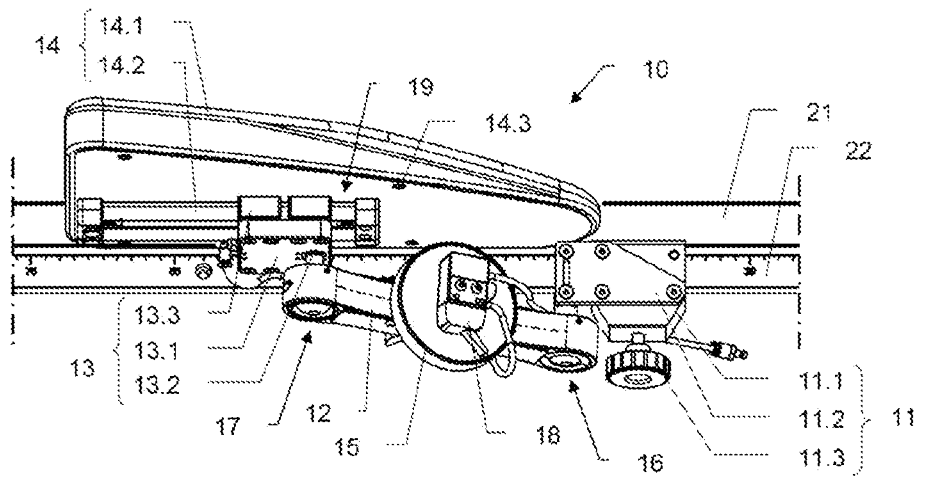
[Fig. 4]
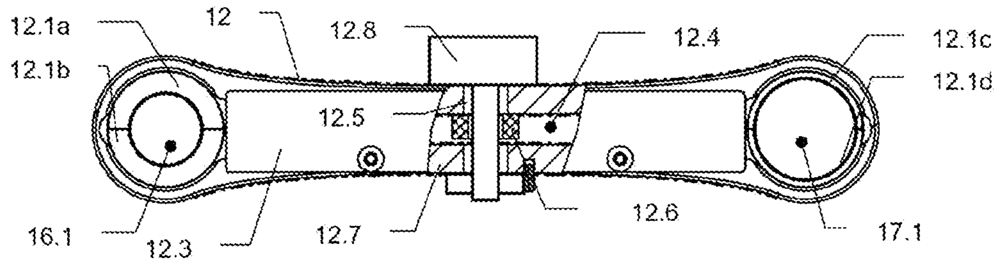
[Fig. 5]
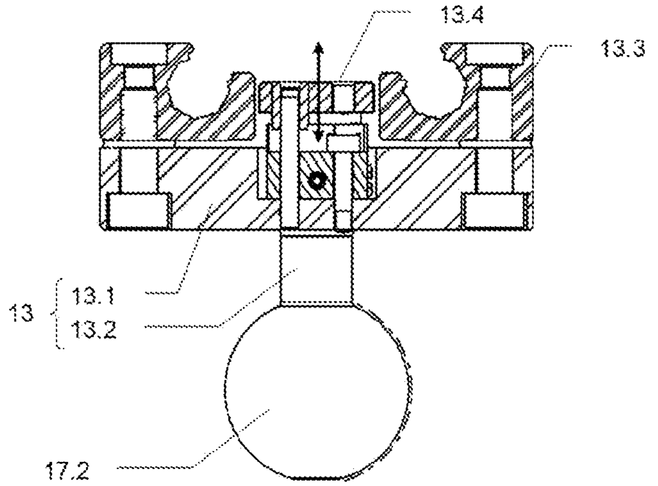

[Fig. 6]
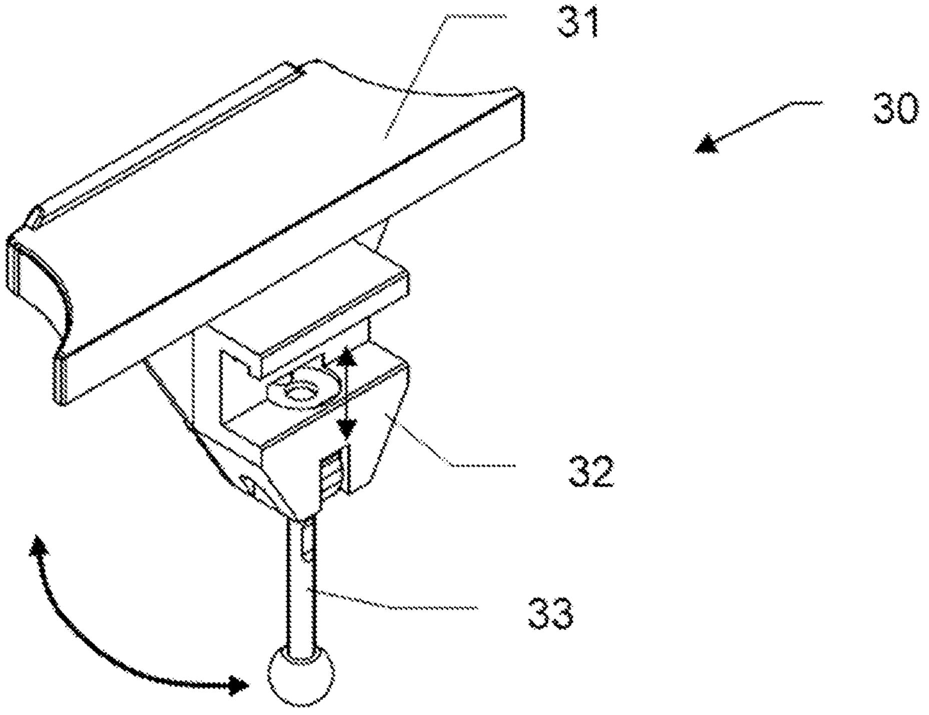
[Fig. 7]
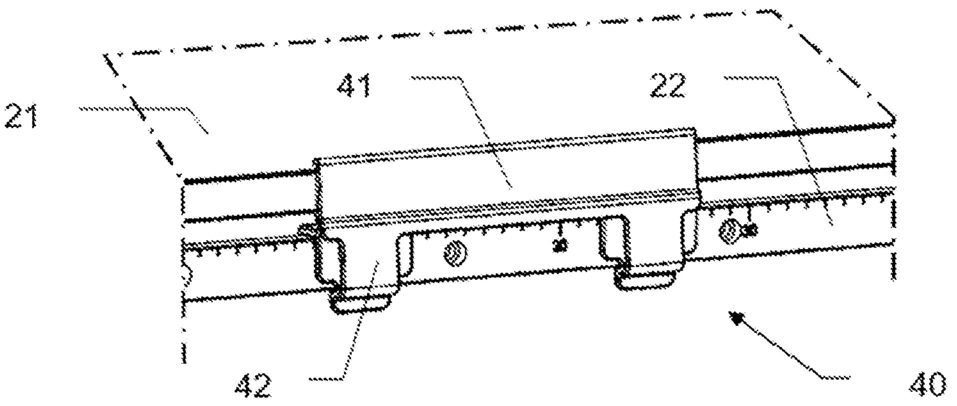

[Fig. 8]
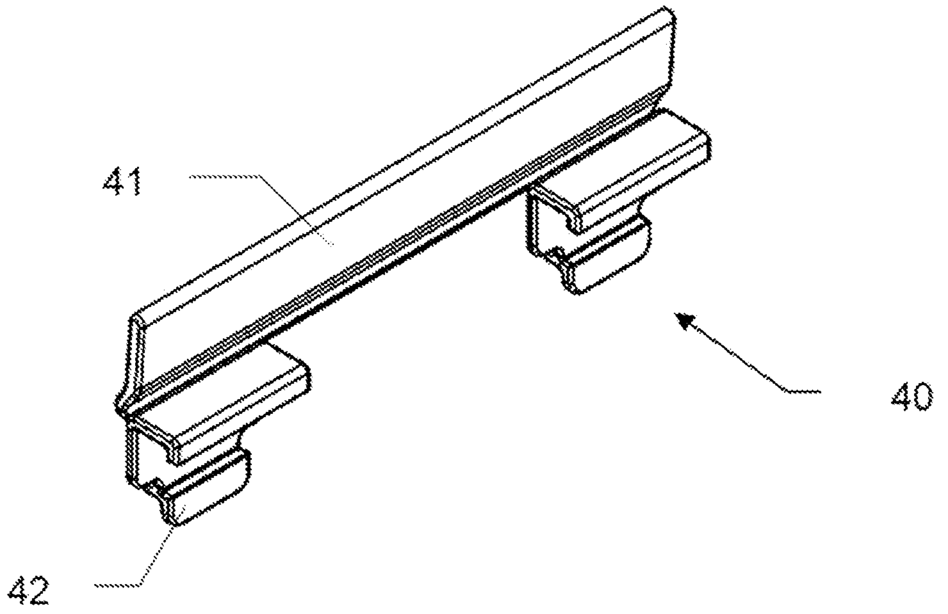
[Fig. 9]
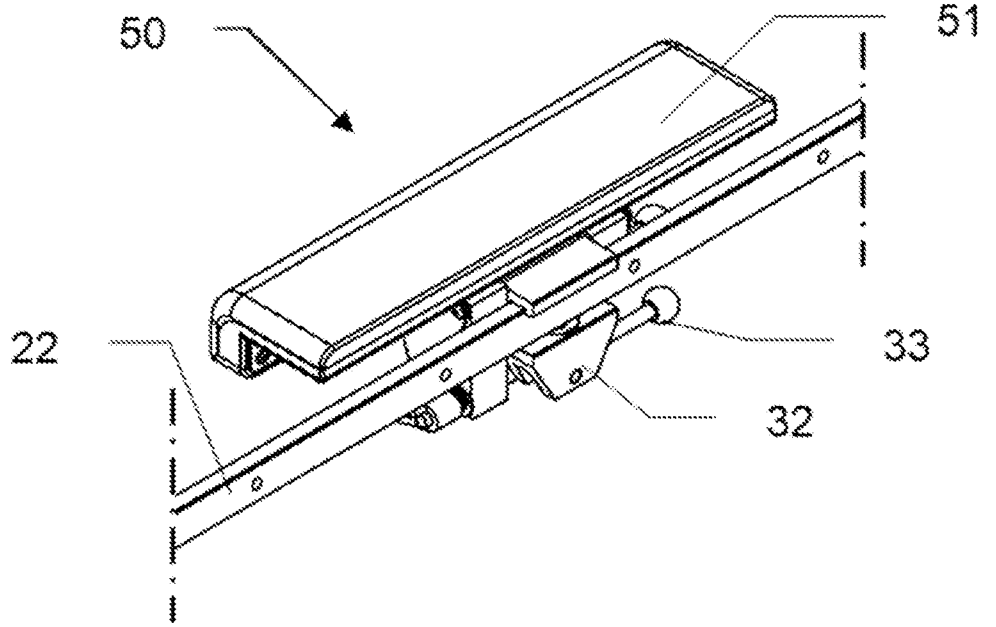

[Fig. 10]
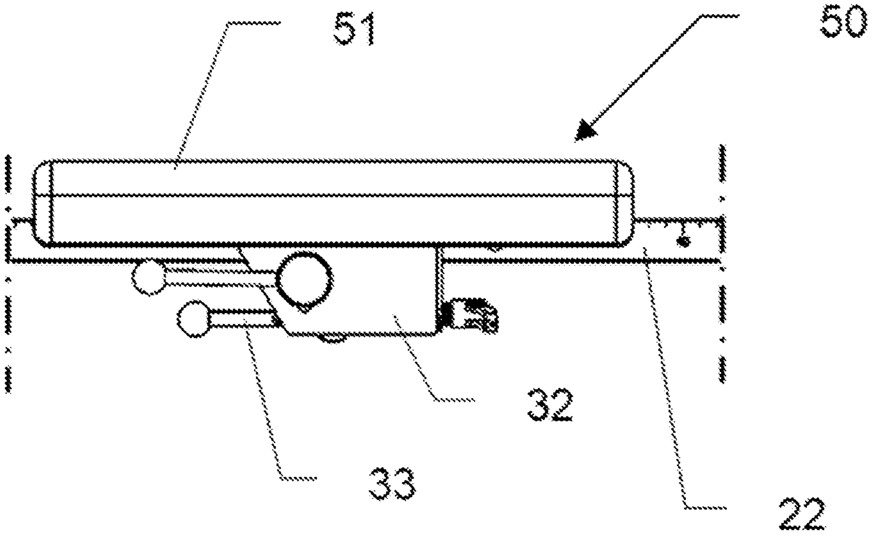
[Fig. 11]
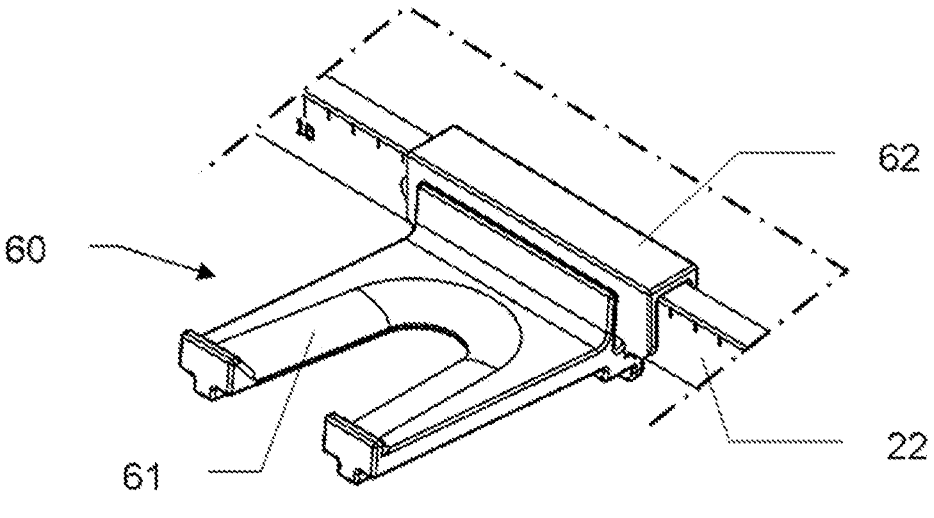

[Fig. 12]
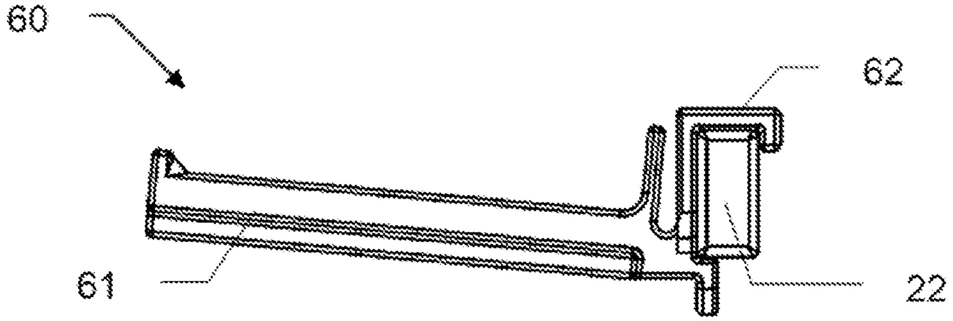

FOREARM SUPPORT FOR A WATCHMAKER'S BENCH AND WATCHMAKER'S BENCH

CROSS-REFERENCE TO RELATED APPLICATIONS

The present application claims priority to European Application No. EP23159283.3 filed with the European Patent Office on Mar. 1, 2023, which is incorporated herein by reference in its entirety for all purposes.

TECHNICAL FIELD OF THE INVENTION

The present invention generally relates to workstations for operators carrying out operations of assembly, adjustment, rework or decoration of timepieces. In other words, the invention relates to watchmaker's benches, and in particular watchmaker's benches comprising forearm supports to allow the operators to rest their forearms or to prop their forearms for the purpose of carrying out minute and precise operations.

PRIOR ART

The present application claims priority to European Application No. EP23159283.3 filed with the European Patent Office on Mar. 1, 2023, which is incorporated herein by reference in their entirety for all purposes.

In the prior art of watchmaker's benches, document CH-715504 B1 is known for example, which discloses a watchmaker's bench with articulated forearm supports. However, the solutions proposed do not allow the operator to adjust his workstation for all needs, nor in an easy manner. In other words, watchmaker's benches like those disclosed in the aforementioned document can limit the adjustment possibilities, particularly as relates to forearm supports, and can also not be very easy or ergonomic to configure. The result can be working discomfort for the operator, time losses in trying to find a configuration that is comfortable and suited to the upcoming work operations. All this can lead to disadvantages which should be avoided, such as for example degraded work experience and/or musculoskeletal disorders.

DISCLOSURE OF THE INVENTION

One object of the present invention is to respond to the disadvantages of the prior art mentioned above, and in particular to propose a forearm support for a watchmaker's bench which allows the operator to control his workstation optimally, rapidly and easily to perform with precision any work operation in complete comfort and without imposing a posture which could lead in the long term to a degraded work experience. Another aspect of the invention is to propose a watchmaker's bench which pursues the same objects.

To this end, a first aspect of the invention relates to a forearm support for a watchmaker's bench, comprising:

- a coupling portion, arranged to be coupled to a watchmaker's bench,
- a first arm linked to the coupling portion,
- a second arm linked to the first arm,
- a forearm support pad, linked to the second arm, and arranged to support a forearm of an operator, characterized in that the forearm support comprises an articulation system comprising at least:

- a first ball joint, arranged between the coupling portion and the first arm and connecting the coupling portion and the first arm,
- a second ball joint, arranged between the first arm and the second arm and connecting the first arm and the second arm.

The forearm support according to the implementation described above comprises a first arm linked, on the one hand, to the bench (via the coupling portion) and on the other hand to the forearm support pad (via the second arm) by two ball joints. Such ball joints allow adjusting with complete freedom the position of the forearm support pad with respect to the watchmaker's bench. In fact, a ball joint allows leaving free three degrees of freedom (in this case three rotations) between the two parts linked or firmly connected by the ball joint. Consequently, it is possible to pivot the first arm relative to the watchmaker's bench in three rotations around orthogonal axes, and to do the same between the second arm and the first arm. The possibilities for adjusting the position in space of the forearm support pad relative to the watchmaker's bench are increased both in position along the axes X, Y or Z of an orthogonal coordinate system and in inclination relative to these axes.

According to one embodiment:

- the first arm can comprise a first end connected to the coupling portion, and a second end,
- the second arm can comprise a first end linked to the second end of the first arm, and a second end linked to the forearm support pad, the first arm can comprise:

- at the first end: a first male ball joint element, or a first housing for receiving a first male ball joint element, and
- at the second end: a second male ball joint element, or a second housing for receiving a second male ball joint element. In other words, the first arm can comprise two male ball joint elements, or two housings each intended to receive a male ball joint element. Alternatively, the first arm can comprise a male ball joint element at one end and a housing at another end.

According to one embodiment, the first male ball joint element can be identical to the second male ball joint element, or the first housing can be identical to the second housing, so that the first arm is symmetrical.

According to the implementation described above, it can be provided that the first arm is symmetrical, i.e. it can be mounted between the coupling portion and the second arm as well as well in one direction as in another: the operations of manufacturing the forearm support would thereby be simplified. Of course, as an alternative, it could also be provided that the first arm is asymmetrical, with differentiated ball joints, in order to allow position coding during assembly and service.

According to one embodiment, the articulation system can comprise a first sliding link, or a first sliding pivot link, arranged between the second arm and the forearm support pad. A sliding link can allow relative movement in translation between the second arm and the forearm support pad. A sliding pivot link can allow relative movement in translation and in rotation around the translation direction between the second arm and the forearm support pad, particularly in the longitudinal direction of the forearm support. These types of link allow offering even more possibilities for adjusting the position in space of the forearm support pad relative to the watchmaker's bench, both in position along the X, Y or Z axes of an orthogonal reference system and in inclination relative to these axes.

According to one embodiment, the forearm support pad can be removably mounted on the second arm. This can allow exchanging one model of forearm support pad for another, and/or reorienting the pad on the slideway.

According to one embodiment, the forearm support can comprise motorization means arranged to move the forearm support pad. Ergonomics can be further improved with motorized assistance.

According to one embodiment, the forearm support can include motorized assistance for at least one articulation of the articulation system. A position memory, configurable by the operator by means of a man-machine interface for retrieving his preferred adjustments, can further improve ergonomics.

According to one embodiment, the articulation system can comprise a carriage or a runner or a slide or a slideway, arranged on the coupling portion to allow sliding link coupling between the coupling portion and a watchmaker's bench. A carriage can be a movable part intended to be moved for example along a guide path of the watchmaker's bench and supporting the rest of the forearm support. A runner can be a member belonging to the coupling portion, with at least one flat guide surface and intended to couple itself to a rail of the watchmaker's bench and participate in guiding. In particular, it is possible to provide a U-shaped ball runner which couples and slides on a rail of the watchmaker's bench. Alternatively, a slide is a guide part following a line and can be a part of the coupling portion, intended to couple with a track and to move in or on the track. Also alternatively, a slideway can be a groove of the coupling portion, intended to couple to a rail, a protrusion or an index of the watchmaker's bench, to slide on it.

According to one embodiment, the forearm support can comprise at least one locking device connected to at least one articulation of the articulation system (comprising at least the first ball joint and the second ball joint, and possibly at least one sliding or sliding pivot link), and arranged to impose on said at least one articulation of the articulation system:

- an unlocked state, in which said at least one articulation of the articulation system can be freely moved,
- a locked state, in which said at least one articulation of the articulation system is blocked. In addition, the forearm support can comprise at least one control device with a man-machine interface intended to allow actuating at least one locking device.

A locking device can allow freezing a configuration setting to then allow the operator to work on the watchmaker's bench comfortably and ergonomically. Preferably, the locking device is connected to a plurality or even to the totality of the articulations of the articulation system, to lock or unlock them in a centralized and/or simultaneous manner. Hence a locking control device of this type, optionally, can allow locking and unlocking the locking device with a single command.

According to one embodiment, the locking device can comprise:

- at least two half-shells arranged around at least one of the first ball joint and of the second ball joint,
- a clamping member, arranged to exert a clamping force on the two half-shells in the locked state and to release the clamping force on the two half-shells in the unlocked state. The clamping force can be a pinching force. It is possible to provide to house the half-shells in the first arm for example, which can for example be perforated to allow pinching of the half-shells. It is possible to provide for a pair of half-shells around each ball joint.

According to one embodiment, the locking device can comprise a movable brake arranged to block relative movement between the second arm and the forearm support pad in the locked state, and to allow relative movement between the second arm and the forearm support pad in the unlocked state. According to one exemplary embodiment, it is possible to provide for a brake pad coupled to an actuator, which can come into contact with the forearm support pad so as to block it by friction.

According to one embodiment, the locking device can be provided to impose on the articulation device a state of prestress in which the articulations are placed under stress so as to exert a friction force greater than an action of the weight of the members of the forearm support. Thus, even unlocked, the articulation device in the prestressed state does not change its configuration or does not undergo movement or displacement under the action of its own weight. It is possible to provide a progressive and/or linear and/or incremental passage between a locked state and a completely free state, so as to progressively and/or linearly and/or incrementally modify the prestressed state. A control using screws or pressure regulation could allow adjusting the prestressed state.

According to one embodiment, the locking device can be pneumatic and/or hydraulic, and/or electrical.

According to one embodiment, the locking device can be connected to a plurality or even to the totality of the articulations of the articulation system, to lock or unlock them in a centralized and/or simultaneous manner.

According to one embodiment, the forearm support can comprise a control board arranged on the first arm or on the second arm, and the control board can support the man-machine interface of the locking control device.

According to one embodiment, the control plate can be adjustable in position.

According to one embodiment, the articulation system can comprise:

- a first stop arranged to limit an angular travel in at least one of the three degrees of freedom in rotation of the first ball joint, or even to limit an angular travel in at least two or even all three degrees of freedom in rotation of the first ball joint, and/or
- a second stop arranged to limit the angular travel in at least one of the three degrees of freedom in rotation of the second ball joint, or even to limit angular travel in at least two or even all three degrees of freedom of the second ball joint. The first stop and/or the second stop can therefore limit an angular travel, to avoid for example that during unlocking the device (rendered free or deformable) falls or moves violently over a great height. Such stops can for example prevent or avoid having the forearm support hanging completely vertical in the event of complete unlocking, which can help the operator in configuring his workstation.

A second aspect of the invention relates to a watchmaker's bench, comprising:

- a work table, arranged to receive timepieces which can be the subject of an operation such as an operation of assembly or decoration,
- a frame, supporting the work table, defining at least one work face or one workstation on the work table for an operator and arranged to rest on a workshop floor, characterized in that the watchmaker's bench comprises a mounting rail, particularly arranged below the work table and facing the work face or the work station, and arranged to receive at least one work module to be coupled to the watchmaker's bench in a position that is adjustable along said at least one mounting rail. The watchmaker's bench according to the implementation described above comprises at least one mounting rail preferably provided below the work table, which does not obstruct access to the work table for the operator, and still allows mounting a work module, removably and/or adjustably. The adjustment and/or configuration possibilities are increased, without affecting access to the work table.

According to one embodiment, at least one articulation of the articulation system can include a set of mechanical cursors, of the graduated or stopped cursor type, which can be actuated and lockable in position by the operator, this in order to facilitate subsequent adjustment to a preferred positioning.

According to one embodiment, at least one ball joint includes discrete positions and/or adjustment marks such as preferred or particular adjustments. A ball cooperating with an arm of the forearm support via a notched system can be considered, where the indexing uses for example a first element with teeth which cooperates with a second element with retaining complementary forms. This configuration allows facilitating an adjustment to a preferred positioning.

According to one embodiment, said at least one mounting rail can extend over at least a quarter, or even at least a third, or even at least half of the length or of the width of the work table. It is possible to provide:

- a single mounting rail over the entire length of the work table, but consisting of several elements mounted end to end,
- two mounting rails each provided on one side of the watchmaker's bench, and interrupted at the workstation,
- parallel mounting rails provided below the work table and each dedicated to specific modules.

Said at least one rail can, according to different embodiments, appear in the form of a single component or can be made of several portions.

According to one embodiment, the watchmaker's bench can comprise a forearm support according to the first aspect, forming at least one work module to be coupled to said at least one mounting rail of the watchmaker's bench, in a position that is adjustable along said at least one mounting rail.

According to one embodiment, the watchmaker's bench can comprise at least one work module to be coupled to said at least one mounting rail forming:

- a table nosepiece, forming an overhang of the work table toward the operator, or
- a table edge or a raised shoulder, arranged protruding relative to a work plane defined by the work table, or
- an instrument support, particularly for an optical reader, arranged to support an instrument, in particular an optical reader, or
- a shock-absorbing cushion, or
- a tool holder, arranged to support work tools, or
- a drawer.

According to one embodiment, said at least one work module to be coupled to said at least one mounting rail can comprise a coupling portion on said at least one mounting rail, comprising:

- a runner, or a carriage that is removable and lockable on said at least one mounting rail, or
- a runner, or a carriage, with at least one elastic portion arranged to allow reversible elastic interlocking on the mounting rail, or
- a runner, or a carriage, (which can be asymmetrical or not) arranged to be engaged on said at least one mounting rail in a rotation movement around an axial direction of said at least one mounting rail.

According to one embodiment, said at least one mounting rail can be flush or recessed relative to a peripheral edge of the work table and/or to a peripheral edge of the frame. In other words, according to one embodiment, said at least one mounting rail does not extend beyond the bottom of the work table.

DESCRIPTION OF THE FIGURES

Other features and advantages of the present invention will appear more clearly upon reading the detailed description which follows of one embodiment of the invention, given by way of an example, which is in no way limiting, and illustrated by the appended drawings, in which:

FIG. 1 shows a general perspective view of a watchmaker's bench according to the invention, comprising a frame, a work table and work modules coupled to a mounting rail arranged below the work table;

FIG. 2 shows a partial view of the work table of FIG. 1 with work modules coupled to the mounting rail arranged below the work table;

FIG. 3 shows a perspective bottom view a work module of FIG. 1 forming a forearm support;

FIG. 4 shows a detail view of a first arm of the forearm support of FIG. 3;

FIG. 5 shows a detail view of a second arm of the forearm support of FIG. 3;

FIG. 6 shows a perspective top view of a work module of FIG. 1 forming a table nosepiece;

FIG. 7 shows a perspective top view of a work module of FIG. 1 forming a raised shoulder;

FIG. 8 shows another perspective view of the raised shoulder of FIG. 7;

FIG. 9 shows a perspective top view of a work module of FIG. 1 forming a shock-absorbing cushion;

FIG. 10 shows a front view of the shock-absorbing cushion of FIG. 9;

FIG. 11 shows a perspective top view of a work module of FIG. 1 forming an optical reader support;

FIG. 12 shows a side view of the optical reader support of FIG. 11.

DETAILED DESCRIPTION OF EMBODIMENT(S)

FIG. 1 shows a general perspective view of a watchmaker's bench according to the invention, comprising:

- a frame 20,
- a work table 21 supported by the frame,
- storage drawers arranged below the work table 21, in two lateral columns,
- a mounting rail 22 arranged below the work table 21,
- two work modules formed by forearm supports 10 coupled to the mounting rail 22,
- a work module formed by a table nosepiece 30 also coupled to the mounting rail 33 and arranged between two forearm supports 10.

It can be noted [in] FIG. 1 that the mounting rail 22 is arranged below the work table 21, and mounted flush with the peripheral edge of the work table 21, so that the mounting rail does not obstruct and/or does not form an obstacle for an operator who may like to press on or to approach the work table 21. The handling of timepieces of small dimensions on the work table 21 is neither hampered nor compromised.

FIG. 2 shows a partial view of the work table 21 of FIG. 1 with the following work modules coupled to the mounting rail 22. The following can be noted:

a forearm support 10 a table nosepiece 30, a raised shoulder 40.

It can be noted that each work module coupled to the mounting rail can be moved along the mounting rail 22 to allow an operator to configure the watchmaker's bench of FIG. 1 according to his needs, to allow this or that work operation, such as assembling timepieces, carrying out rework, adjustments, or even decoration operations. Thus, the relative position between the work modules can easily be adjusted, such as for example the center distance between the two forearm supports 10 of FIG. 1.

As will be explained in detail below, each work module can be moved along the mounting rail 22, coupled reversibly to the mounting rail 22, locked/unlocked on the mounting rail 22, so as to offer great modularity and numerous possible uses, while guaranteeing reliable use and a robust structure.

FIG. 3 shows a perspective bottom view of a work module of FIG. 1 forming a forearm support 10, which comprises in particular:

a coupling portion 11, coupled to the mounting rail 22, a first arm 12 linked to the coupling portion 11, a second arm 13 linked to the first arm 12, a forearm support pad 14, linked to the second arm 13, and arranged to support a forearm of an operator, a first ball joint 16, arranged between the coupling portion 11 and the first arm 12, a second ball joint 17, arranged between the first arm 12 and the second arm 13, a sliding armrest link 19, arranged between the second arm 13 and the forearm support pad 14.

In detail, the coupling portion 11 comprises in particular:

a runner or a carriage 11.1 coupled to the mounting rail 22 to form a sliding link, a first intermediate support 11.2 mounted to the carriage 11.1 and supporting a first male ball joint element of the first ball joint 16, a control knob 11.3 for accomplishing a lockable and removable engagement of the carriage 11.1 on the mounting rail 22.

The carriage 11.1 can be a carriage which can be asymmetrical or a clamp that is tiltable to be easily mounted on/removed from the mounting rail 22, with locking by screwing via a control knob 11.3, which can alternatively be a spring-loaded positioning index.

The first arm 12 comprises two female ball joint element housings of the first ball joint 16 and of the second ball joint 17, and supports a control board 15 which receives a man-machine interface 18 of a locking control device.

The second arm 13 comprises a second intermediate support 13.1, which receives on the one hand a connecting rod of a second male ball joint element of the second ball joint 17.2, and which supports on the other hand clamps for a guide shaft 13.3.

The forearm support pad 14, for its part, comprises a support cushion 14.1, which is arrange to receive or support a forearm of an operator, and guide shafts 14.2 which are engaged with the clamps for guide shaft 13.3 of the second arm 13 to form the sliding armrest link 19. It can be noted that the lower face of the support cushion 14.1 comprises free mounting holes 14.3 which can serve for mounting the guide shafts 14.2 in other positions than that shown in FIG. 3.

FIG. 4 shows the first arm 12 in top view, to clearly show its structure. The first arm 12 comprises a first female ball joint element housing 16.1 of the first ball joint 16, and a second female ball joint element housing 17.1 of the second ball joint 17. The first female ball joint element housing 16.1 and the second female ball joint element housing 17.1 are each formed by two half-shells, respectively 12.1*a* and 12.1*b*, 12.1*c* and 12.1*d* mounted to the first arm 12. It can be noted that the first ball joint 16 has a greater diameter than that of the second ball joint 17; the reasons will be explained below.

It can also be noted that the first arm 12 is perforated over its entire length to have a central recess 12.4 separating two walls 12.7 having central openings 12.5, with a central ring 12.6 mounted in the central recess 12.4 with clearance, and arranged facing the central openings 12.5. Mounting a clamping member 12.8 through the central openings 12.5 (a screw system, an actuator . . . ) can be considered, to bring the two walls 12.7 together in order to clamp the half-shells 12.1*a* and 12.1*b*, 12.1*c* and 12.1*d*, and thus lock or block the first ball joint 16 and the second ball joint 17. The central ring 12.6 then serves as a stop to avoid excessive deformations and/or stresses, and a hood 12.3 covers the central recess 12.4.

It can be noted that the first arm 12 is perforated over its length, which allows in particular the introduction of the ball joints 16 and 17 (in particular the half-shells 12.1*a* and 12.1*b*, 12.1*c* and 12.1*d* of the ball joints 16 and 17). A pair of half-shells, 12.1*a*-12.1*b*, for the ball joint 16 and 12.1*c*-12.1*d* for the ball joint 17, partly surround each of the balls and is introduced into each of the openings positioned at the longitudinal ends of the first arm 12. Mounting screws allow the retention of the half-shell/ball assembly on the first arm 12. By means of the clamping member 12.8 (for example at least one pneumatic actuator) present in the first arm 12, a force can be applied to the lateral walls of the first arm 12 to move them together, applying a locking force by pinching the half-shell/ball assembly.

Within the locking system of the balls, clamping the lateral walls of the first arm 12 applies an elastic force against the half-shell/ball assembly. This causes the locking of the balls. The half-shells must be resistant to wear, and the arm must be relatively elastic.

It can be noted that it may be appropriate to use the system of half-shells described above as replaceable elements rather than machining a ball housing directly in the first arm 12; this allows avoiding high machining costs and complex manufacturing. Moreover, in the event of wear, the replacement of each worn part of the half-shell system described above does not necessitate the complete disassembly of the device.

Finally, it can be noted that in the locked state, the torque on each ball joint 16, 17 can be greater at the first end of the first arm 12 (on the side of the coupling portion 11) than on the second end of the first arm 12 (on the side of the second arm 13), particularly in case of complete deployment of the system. To resist any slippage and guarantee locking both of the first ball joint 16 and of the second ball joint 17 with the same pinching force of the first arm 12, it may optionally be provided that the diameter of the female spherical housing and of the male ball joint element of the first ball joint 16 are greater than those of the second ball joint 17, which would lead to differences in geometry and of the contact surface of the half-shells on the balls.

FIG. 5 shows a detail view of the second arm 13 of the forearm support of FIG. 3. FIG. 5 is a transverse section view in the direction of the guide shaft clamps 13.3. Seen there is the first intermediate support 13.1 which receives, on the one hand, a connecting rod 13.2 of a second male ball joint element 17.2 of the second ball joint 17, and which supports on the other hand the guide shaft clamps 13.3. Also notable is the presence of a movable brake 13.4 (for example a friction brake runner) arranged between the guide shaft clamps 13.3. The movable brake 13.4 can be coupled for example to a rodless actuator to move vertically and come into contact with the lower wall of the support cushion 14.1, and thus offer the possibility of (reversibly) locking the sliding link formed by the guide shafts 14.2 received in the guide shaft clamps 13.3.

It can be noted that:

the first ball joint, the second ball joint and the sliding armrest link 19 form an articulation device, articulation device which can comprise a carriage or a runner or a slide or a slideway, arranged on the coupling portion to allow sliding link coupling between the coupling portion and a watchmaker's bench, the perforated structure of the first arm, the clamping device 12.8 passing through the central openings 12.5, as well as the movable brake 13.4, form or at least form a part of a locking device of the articulation device.

The articulation device allows offering the operator multiple possibilities for adjusting the relative position between the mounting rail 22 (the frame 20) and the support cushion 14.1. In particular, the first ball joint 16 allows moving the first arm 12 relative to the coupling portion 11 in three degrees of freedom in rotation, and likewise between the second arm 13 and the first arm 12 with the second ball joint 17. The sliding armrest link 19 allows offering other adjustment positions, as well as the coupling portion 11 which can be moved in translation along the mounting rail 22.

The locking device can be controlled manually (for example with screw or spring members), but an electrical or pneumatic or even hydraulic control device can advantageously be provided as the locking control device, with, as here, a man machine interface 18 provided on the control board 15. One or more actuators can be provided to carry out these locking/unlocking operations individually, independently of one another. Alternatively, it is possible to provide for controlling the entire locking device to simultaneously lock or block all the articulations of the articulation device, or to un-block all of them together. In this case, this is a centralized locking device. It is possible to also provide an intermediate solution with certain locking/unlocking operations independent of one another, and other locking/unlocking operations carried out in a common or centralized manner.

It is also possible to provide for controlling the locking of the coupling portion 11 on the mounting rail 22 with the same locking device, and its locking control device in the case of a centralized locking device. To this end, it is possible to provide for adding an actuator to the control knob 11.3.

FIG. 6 shows a perspective top view of a work module of FIG. 1 forming a table nosepiece 30, which comprises in particular:

a table extension 31, a carriage 32 supporting the table extension 31 and having in particular, in the example shown, an asymmetrical shape to be able to be rapidly assembled to/disassembled from the mounting rail 22 by lifting and/or rotation, a locking knob 33 able to pivot to move an index which, in the deployed position, locks the carriage 32 on the mounting rail 22, and which in the retracted position allows the disassembly of the carriage 32 from the mounting rail 22.

It can be noted that the table extension 31 is intended to be located in the same plane as that of the work table 21, so as to allow certain parts or tools to be placed on it.

FIGS. 7 and 8 show perspective views of a work module of FIG. 1 forming a raised shoulder 40, which comprises:

an edge 41, arranged to extend beyond the work plane of the work table 21, a clipping carriage 42, with flexible tabs to allow rapid assembly to/disassembly from the mounting rail 22.

Thus, to prevent parts placed on the work table 21 from falling to the floor, the operator can rapidly position/couple-plug/move/disassemble the raised shoulder 40 along the mounting rail 22.

FIGS. 9 and 10 show respectively perspective and front views of a work module of FIG. 2 forming a shock-absorbing cushion 50, which comprises:

a cushion portion 51 on which the operator can be supported, a carriage 32 supporting the cushion portion 51 and having, as for the table nosepiece 30 of FIG. 6, an asymmetrical shape in the example shown, to be able to be rapidly assembled to/disassembled from the mounting rail 22 by lifting and/or rotation, a locking knob 33 able to pivot to, as for the table nosepiece 30 of FIG. 6, move an index which, in the deployed position, locks the asymmetrical carriage 32 on the mounting rail 22, and which in the retracted position allows the disassembly of the asymmetrical carriage 32 from the mounting rail 22.

FIGS. 11 and 12 show respectively perspective and side views of a work module of FIG. 1 forming a support of an instrument, in particular an optical reader, which comprises:

a support fork 61, intended to receive an instrument, in particular an optical reader (a bar-code reader for example), a clipping carriage 62, with one or more flexible tabs to allow rapid assembly to/disassembly from the mounting rail 22.

Thus it is understood that the watchmaker's bench described can easily, and reversibly receive multiple work modules, all adjustable in position along the mounting rail 22, the latter preferably not extending beyond the work table 21. Ergonomics is improved and modularity particularly increased.

As regards the forearm support 10, it can be noted that its use is simple, with a single control of the locking device according to one preferred embodiment, and its architecture offers a great variety of adjustments to adjust itself to the wishes of the operator, particularly regarding its morphology, and/or to the operations to be carried out.

INDUSTRIAL APPLICATION

A watchmaker's bench, a forearm support and work modules according to the present invention, and their manufacture, are eligible for industrial application.

It will be understood that various modifications and/or improvements obvious to a person skilled in the art can be applied to the different embodiments of the invention described in the present description without departing from the scope of the invention.

In particular, it can be noted that the work modules can be adapted to and/or provided for other functions suitable to watchmaking (lighting, cleaning, provisioning or storage of components, instruments or tools . . . ).

It can also be noted that it is possible to add other intermediate or additional articulations (the first arm and/or the second arm can be adjustable in length, a sliding pivot link can be provided in place of the sliding forearm link as illustrated by FIG. 3).

The locking device can be motorized or be provided with an assistance as in the example described, but manual clamping and/or locking systems can be provided, such as elastic toggle clamps, retractable indexes or screw systems, even if assisted systems are preferred to avoid musculoskeletal disorders in the long term.

It is possible to provide for motorizing the forearm support to automate or assist certain adjustments, such as for example the relative movement between the forearm support pad 14 and the second arm 13. It is possible for example to provide for pneumatic, electrical or hydraulic assistance.

The invention claimed is:

1. A forearm support for a watchmaker's bench, comprising:

a coupling portion, arranged to be coupled to a watchmaker's bench, a first arm linked to the coupling portion, a second arm linked to the first arm, a forearm support pad, linked to the second arm, and arranged to support a forearm of an operator, characterized in that the forearm support comprises an articulation system comprising at least:

a first ball joint, arranged between the coupling portion and the first arm and connecting the coupling portion and the first arm, a second ball joint, arranged between the first arm and the second arm and connecting the first arm and the second arm.

2. The forearm support according to claim 1, wherein:

the first arm comprises a first end linked to the coupling portion, and a second end, the second arm comprises a first end linked to the second end of the first arm, and a second end, linked to the forearm support pad, wherein the first arm comprises:

at the first end: a first male ball joint, or a first housing for receiving a first male ball joint, and at the second end: a second male ball joint, or a second housing for receiving a second male ball joint.

3. The forearm support according to claim 1, wherein the articulation system comprises a first sliding link, or a first sliding pivot link, arranged between the second arm and the forearm support pad.

4. The forearm support according to claim 1, wherein the forearm support pad is mounted removably on the second arm.

5. The forearm support according to claim 1, wherein the articulation system comprises a carriage or a runner or a slide or a slideway, arranged on the coupling portion to allow sliding link coupling between the coupling portion and a watchmaker's bench.

6. The forearm support according to claim 1, comprising at least one locking device connected to at least one articulation of the articulation system comprising at least the first ball joint and the second ball joint, and arranged to impose on said at least one articulation of the articulation system:

an unlocked state, wherein said at least one articulation of the articulation system can be freely moved, a locked state, wherein said at least one articulation of the articulation system is blocked, and comprising at least one locking control device with a man-machine interface intended to allow actuating at least one locking device.

7. The forearm support according to claim 6, wherein the locking device comprises:

at least two half-shells arranged around one of the first ball joint and of the second ball joint, a clamping member, arranged to exert a clamping force on the two half-shells in the locked state and the release the clamping force on the two half-shells in the unlocked state.

8. The forearm support according to claim 6, wherein the locking device comprises a movable brake arranged to block relative movement between the second arm and the forearm support pad in the locked state, and to allow relative movement between the second arm and the forearm support pad in the unlocked state.

9. The forearm support according to claim 6, wherein the locking device is pneumatic and/or hydraulic, and/or electric.

10. The forearm support according to claim 6, wherein the locking device is connected to a plurality or to the totality of the articulations of the articulation system, to lock or unlock them in a centralized and/or simultaneous manner.

11. A watchmaker's bench, comprising:

a work table, arranged to receive timepieces, a frame, supporting the work table, defining at least one work face or one work station on the work table for an operator and arranged to rest on a workshop floor, characterized in that the watchmaker's bench comprises at least one mounting rail, particularly arranged below the work table and facing the work face or the work station, and arranged to receive at least one work module to be coupled to the watchmaker's bench in a position that is adjustable along said at least one mounting rail, and comprising a forearm support according to claim 1, forming at least one work module to be coupled to said at least one mounting rail of the watchmaker's bench in a position that is adjustable along said at least one mounting rail.

12. The watchmaker's bench according to claim 11, comprising at least one work module to be coupled to said at least one mounting rail forming:

a table nosepiece, forming an overhang of the work table toward the operator, or a table edge or a raised shoulder, arranged protruding relative to a work plane defined by the work table, or an instrument support, particularly for an optical reader, arranged to support an instrument, in particular an optical reader, or a shock-absorbing cushion, or a tool holder, arranged to support work tools, or a drawer.

13. The watchmaker's bench according to claim 11, wherein said at least one working module to be coupled to said at least one mounting rail comprises a coupling portion on said at least one mounting rail comprising:

a runner or a carriage, removable and lockable on said at least one mounting rail, or a runner or a carriage, with at least one elastic portion arranged to allow reversible elastic interlocking on said at least one mounting rail, or a runner or a carriage, arranged to be engaged on said at least one mounting rail in a rotation movement around an axial direction of said at least one mounting rail.

14. The watchmaker's bench according to claim 11, wherein said at least one mounting rail is flush or recessed with respect to a peripheral edge of the work table and/or a peripheral edge of the frame.

* * * * *